United States Patent [19]

Garcia et al.

[11] Patent Number: 4,752,848

[45] Date of Patent: Jun. 21, 1988

[54] SPACING DEVICE FOR MAGNETIC RECORDING AND/OR READING HEAD-HOLDER PADS IN A DISC MEMORY APPARATUS

[75] Inventors: Salvador Garcia, Argenteuil; Christian Vetu, Colombes, both of France

[73] Assignee: Societe d'Applications Generales d'Electricite et de Mecanique SAGEM, Paris, France

[21] Appl. No.: 918,576

[22] Filed: Oct. 14, 1986

[30] Foreign Application Priority Data

Oct. 14, 1985 [FR] France .................. 85 15204

[51] Int. Cl.⁴ .............................................. G11B 5/54
[52] U.S. Cl. ................................................... 360/105
[58] Field of Search ........................................ 360/105

[56] References Cited

U.S. PATENT DOCUMENTS 3,984,873  10/1976  Pejcha .................. 360/105
4,644,429  2/1987  Boe ....................... 360/105

FOREIGN PATENT DOCUMENTS 2089595  1/1972  France .
60-29981  2/1985  Japan .

OTHER PUBLICATIONS

IBM TDB, vol. 15, No. 9, Feb. 1973, p. 2750, R. Wilkinson; Retraction Device for Magnetic Transducer Ass.
"Magnetic Head Load/Unload Device", by S. E. Wheeler, IBM Technical Disclosure Bulletin, vol. 18, No. 9, Feb. 1976, pp. 3018-3019.

Primary Examiner—A. J. Heinz
Attorney, Agent, or Firm—Fleit, Jacobson, Cohn & Price

[57] ABSTRACT

Spacing device for magnetic recording and/or reading head-holder pads, characterized in that it comprises, for each pad, an inner fixed spacing ramp, namely situated not far from the rotary axle of the discs, this ramp being inclined with respect to the surface of the latter, and at the end of a support arm, a sliding part adapted to cooperate with said ramp and to space said pad from the surface of the disc concerned when, by actuation of the drive means, said support arm is moved radially towards said axle.

5 Claims, 4 Drawing Sheets

SPACING DEVICE FOR MAGNETIC RECORDING AND/OR READING HEAD-HOLDER PADS IN A DISC MEMORY APPARATUS

The present invention relates to a spacing device for magnetic recording an/or reading head-holder pads, in a disc memory apparatus, each pad being borne, through an attitude spring, by a support arm coupled to drive means, so that the pads are displaceable radially with respect to the discs, at a very short distance from the surface concerned of the letter, this device comprising, for each pad, a fixed spacing ramp inclined with respect to the surface of the discs and, at the end of said support arm, a sliding part adapted to cooperate with said ramp and to space said pad from the surface of the disc concerned without a force exerted directly on said pad or its attitude spring, when, by actuation of said drive means, said support arm is moved radially.

For the transportation of such equipment or when for any other reason they are likely to be subjected to vibrations or shock during a period of non-use, it is convenient to bring the pads which carry the magnetic heads into a position such that they cannot knock against the magnetic areas of the discs, which would damage them.

In certain equipment, for this purpose, spacing and withdrawal of the pads is performed in the following manner: the end of the support arm at which the pad is suspended slides over the spacing ramp for the pads. whilst the latter is extracted from between the discs by rotation of the arm. This type of system, described for example, in the document U.S. Pat. No. 3,984,873, has the drawback of notably increasing the bulk of the apparatus.

In other equipment of the type for spacing the pads (FR-A-2,089,595), the pads are not extracted from between the discs during the spacing, but the fixed ramps which permit the spacing of the pads during radial movement of their support arms, are external to the discs and positioned laterally with respect to these arms; this radial movement of the arm is centrifugal in direction. Here again, the drawback of these apparatuses resides among other things in their large bulk, especially if several pad-holder arms are used placed one beside the other along the periphery of the discs.

It is an object of the present invention to overcome there drawbacks of the prior art, particularly, but not exclusively, in the case of disc memory apparatus comprising several radially off-set, pads per disc surface.

To this end, the invention relates to a spacing device for pads of the type mentioned at the beginning, essentially characterized in that said fixed spacing ramp is inside, namely situated between the discs, not far from the axis of rotation of the latter, and in that during the spacing operations said support arm is moved radially towards said axis.

In this way, the bulk of the apparatus is considerably reduced, the spacing ramp being positioned inside, between the discs; the apparatus is much more compact and simplified, by comparison with known apparatus.

The fact that the spacing ramps are positioned close to the axis of rotation of the discs permits in addition a very notable advantage: to take into account inevitable inaccuracies at the level of the ramps, it is convenient to provide, in all apparatus of the pad spacing type, and by way of safety, a certain radial distance over which the tracks closest to these ramps are devoid of data, considering that, from a lowering of the pads towards the discs, these pads are moved radially, of course in the direction which spaces them from the ramps. This being the case, the fact of providing these ramps close to the axis of rotation of the discs will permit the straightened length of the tracks on which there is no data to be reduced, since these tracks are close to the center. The length of track lost is thus distinctly less than with apparatus in which the ramps are external to the discs.

In the device designed for an apparatus of the type with disc stacks, support arms bearing the pads being arranged in each of the spaces separating two neighboring discs, one group of pads being assigned to one of the discs and the other group to the other disc, it is also possible to provide, in accordance to the invention, in each of said spaces, a common part bearing two spacing ramps symmetrical with one another with respect to a middle plane parallel with the discs, these ramps being respectively associated with said groups of pads.

One embodiment of the invention as well as other arrangements, complementary with the above described arrangement, will now be described, by way of purely non-limiting examples, with reference to the figures of the accompanying drawing in which.

Figure 1:
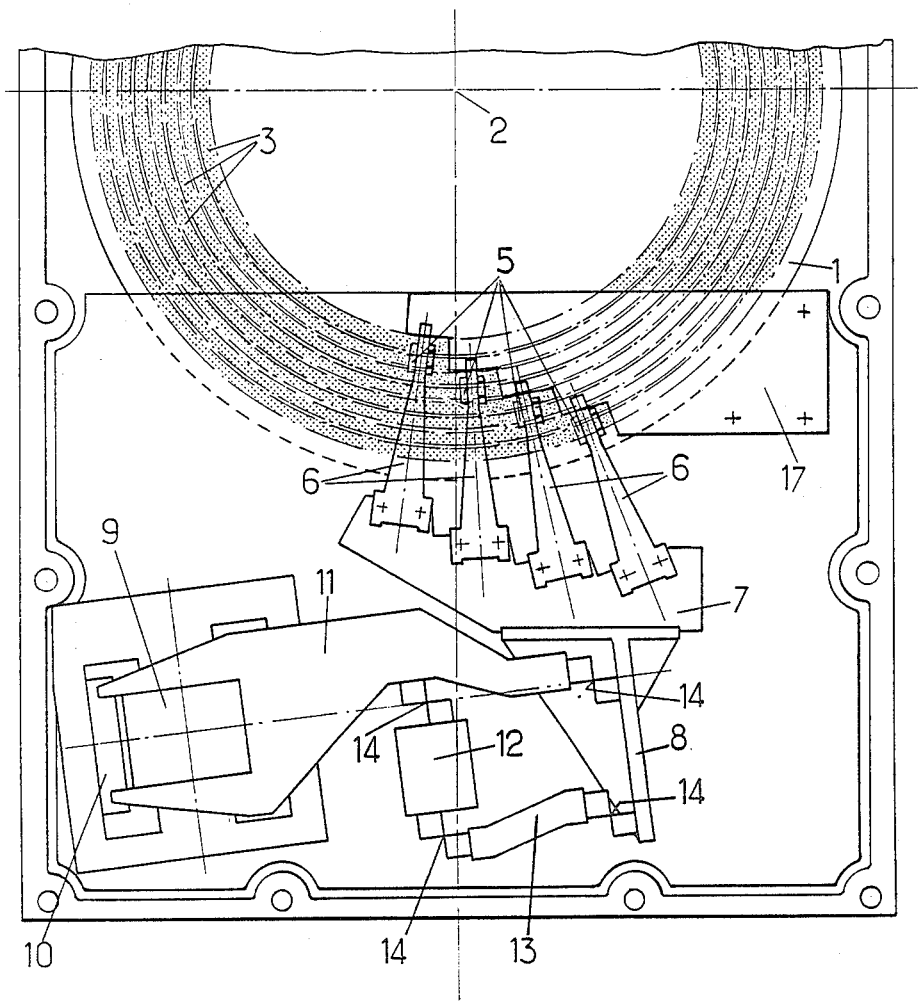
FIG. 1 is a diagrammatic and partial plan view of a disc memory apparatus equipped with a pad spacing device according to the present invention.

In FIG. 1, is referenced at 1 a magnetic disc with an axis of rotation 2 and which can form part of a stack of discs on the same axis. These discs possess two magnetic surfaces bearing concentric magnetic areas 3 suitable for exploration by magnetic heads 4. These heads are borne by pads 5 in the proportion, for example, of two per pad (see FIG. 3). Each pad being associated with two consecutive magnetic areas 3 (one area per head 4), it is seen in FIG. 1 that the apparatus comprises four pads 5, the number of magnetic areas being eight. The pads 5 are hence off-set radially, each with respect to the following one.

As is also visible in FIG. 1, each pad 5 is borne by a support arm constituting a principal spring 6, which produces the force necessary for the compensation of the aerodynamic forces acting on the pad during the rotation of the disc, the four arms 6 being themselves fast to a common support 7 borne by an arm 8.

The drive means enabling the arms 6 and hence the pads 5 to perform radial movements comprise and electrodynamic motor whose driving member is constituted by a coil 9 supplied with current in controlled manner and situated in the magnetic field of a permanent magnet 10. The coil is coupled mechanically to the arm 8 through an articulated parallelogram system comprising a principal arm 11, a fixed reference 12, a secondary arm 13 and the arm 8, these elements being connected two by two in articulated manner through parallel axles 14 perpendicular to the planes of the discs 1.

The disc memory apparatus being thus described broadly, the subject of the invention, concerning the spacing of the pads from the surfaces of the discs will now be described.

For the essential part it comprises a fixed spacing ramp 15 which can cooperate by relative sliding with the sliding parts 16 provided at the end of each of the arms 6. The inclination and the configuration of the different parts of this ramp 15 are such that the pads 5 facing at least one same disc surface may all be spaced from the latter during a radial movement of the common support 7, in the direction of the axle 2, caused by actuating the drive means 9, 10.

Figure 2:
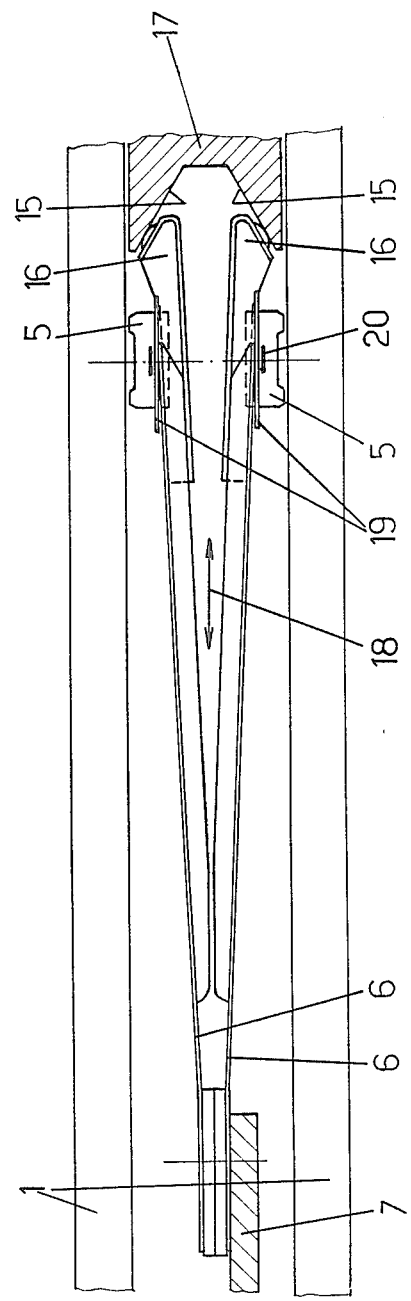
FIG. 2 is a diagrammatic view in vertical section showing a spacing device associated with two support arms arranged between two consecutive discs of the apparatus.

In FIG. 2, are shown two magnetic discs 1 of a stack of discs, and two support arms 6 positioned symmetrically with respect to one another, and each of which bears at its end a head-holder pad 5, these pads being respectively assigned to the reading of two opposite zones 3 on the discs 1 (or for the recording of data on the zones).

The sliding parts 16 of the two arms can then slide respectively over the two spacing ramps 15 provided on a single part 17 and symmetrical with one another with respect to a middle plane parallel with the discs.

It is clearly seen in FIG. 2 that when, under the action of the drive means 9 and 10, the common support 7 of the arms 6 is moved radially towards the axle 2, the parts 16 have slid respectively over the two ramps 15 thus causing the withdrawal of the pads 5 with respect to the opposite surfaces of the two discs 1.

When this spacing operation has been carried out, means for locking the electrodynamic motor, for example an electromagnet device, are operated to avoid that in the absence of current supplying the coil the arms do not move in reverse direction, radially outwards, which would cause the pads to redescend onto the discs. It is possible to provide for this purpose for the plunger of the electromagnet to be blocked in the absence of current in a housing of the arm 8 of the positioning device.

It is also possible to provide, to be able to space the pads 5 from the surfaces of the discs even after cutting the supply current from the apparatus, for the current necessary for the actuation of the drive means 9, 10 to come in this case from the recovery of the rotaty energy of the discs 1 through their drive motor, of D.C. or similar type.

Figure 3:
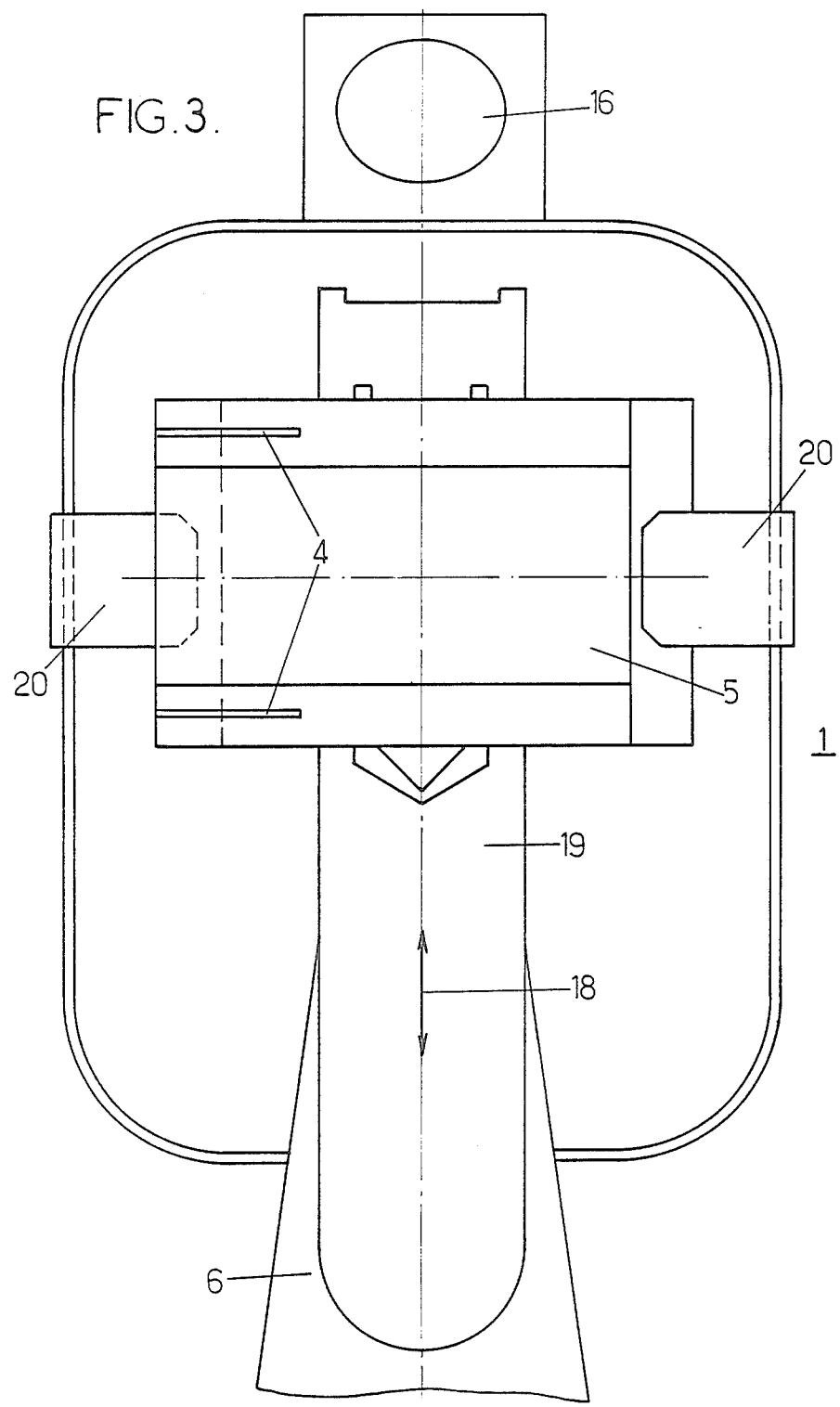
FIG. 3 is a partial and more detailed view from below, of the spacing device associated with a support arm.
Figure 4:
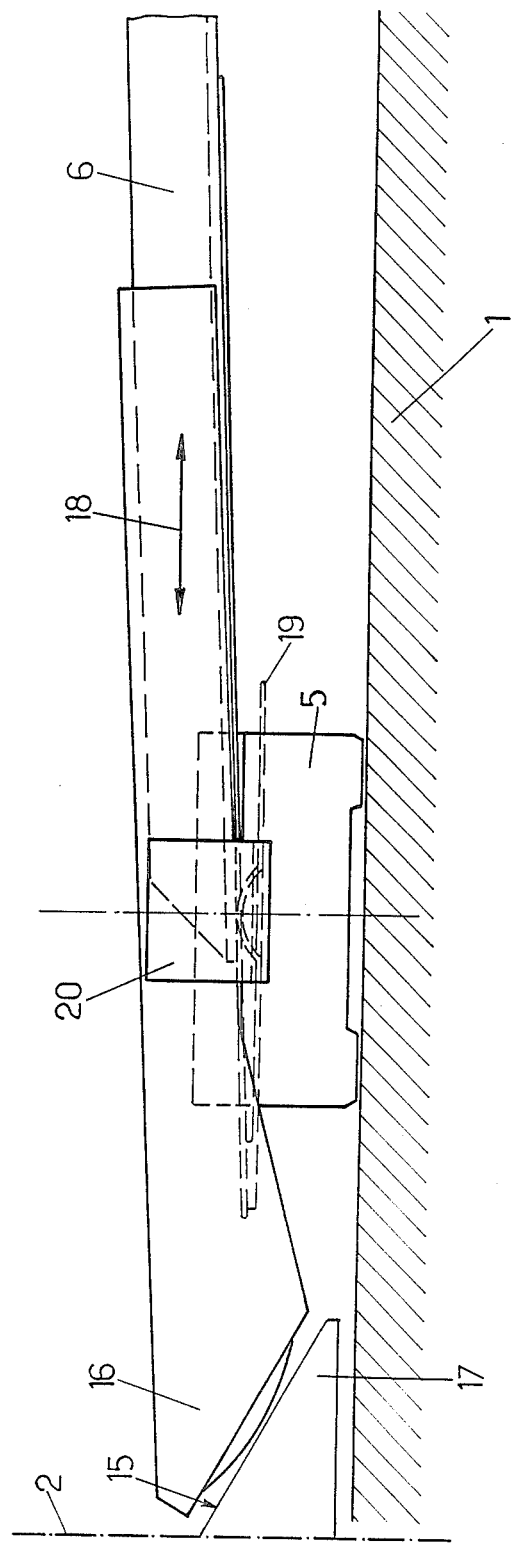
FIG. 4 is a corresponding veiw in elevation.

In FIGS. 2 to 4, are referenced at 18 radial arrows showing the possible movements of the arms 6, and there is shown at 19 attitude springs of very little stiffness, enabling the pads 5 to assume their correct "hover attitude" over the discs 1 in rotation, after the withdrawal of the arms 6 from the ramps 15.

In order that, during the withdrawal and then the locking of the pads in a position spaced from the discs 1, the attitude springs 19 should not be distorted, thus risking the subsequent behavior of the pads 5 to be compromised in the phases of placing in hover attitude, normal hover or subsequent spacing, two principal arrangements are adopted.

The first consists of exerting the withdrawal forces at the level of the arms 6 through the sliding parts 16, and in no case directly on the pads 5 or the attitude springs 19.

The second consists of providing arms 6 for limiting the movement 20 of the pads 5, constructed in the form of angle plates which pass with slight play beneath the overhanging portions of the pads 5, and which exert their action of limiting the movement of said pads in the case of shock or vibration occuring in the course of withdrawal or in spaced position.

We claim:

1. The combination comprising a disc having an axis of rotation and having on at least one surface a plurality of concentric magnetic areas, a plurality of pads each carrying at least one head, a plurality of support arms extending radially over said surface of said disc, at least one pad mounted on each support arm, an attitude spring bearing each pad on said support arm, mounting means mounting said support arms for radial movement relative to said disc and to position each said pad at a very short distance from said surface of a disc, drive means coupled to said mounting means for radially moving said support arms relative to said disc, fixed spacing ramp means defining a plurality of surfaces inclined with respect to said surface of said disc, said fixed spacing ramp means located near said surface radially inwardly from the periphery of the disc near the axis of said disc, each said support arm having a sliding part defined at its radially inner end for cooperating with an inclined surface of said fixed spacing ramp means to space the pad mounted on said support arm from the surface of the disc without force exerted directly on said pad or its attitude spring when said drive means is actuated and said support arm is moved radially toward the axis of said disc.

2. The combination comprising a stack of at least two discs coaxially arranged in spaced relationship, said discs on their facing surfaces each defining a plurality of concentric magnetic areas, a plurality of pads each carrying at least one head, a plurality of support arms extending radially into the space between facing surfaces of adjacent discs, at least one pad mounted on each support arm, an attitude spring bearing each pad on said support arm, mounting means mounting said support arms for radial movement relative to said stack of discs and to position each said pad at a very short distance from a surface of a disc, drive means coupled to said mounting means for radially moving said support arms relative to said stack of discs, fixed spacing ramp means defining a plurality of surfaces inclined with respect to the facing surfaces of the stack of discs, said fixed spacing ramp means located between said facing surfaces radially inwardly from the peripheries of the discs near the axis of said stack of discs, each said support arm having a sliding part defined at its radially inner end for cooperating with an inclined surface of said fixed spacing ramp means to space the pad mounted on said support arm from the associated surface of the disc without force exerted directly on said pad or its attitude spring when said drive means is actuated and said support arm is moved radially toward the axis of said stack of discs.

3. The combination of claim 2 wherein support arms bearing pads are arranged in each of the spaces defined between neighboring discs of the stack, one group of pads being assigned to one of the discs and the other group to the other disc, said fixed spacing ramp means defining a common part having two inclined surfaces symmetrical with one another with respect to a middle plane parallel with the discs, said inclined surfaces being respectively assigned to said groups of pads.

4. The combination of claim 2 further including locking means for locking said support arms for maintaining the pads in their spaced position from the respective surfaces of the discs, even when said drive means are not actuated.

5. The combination of claim 2 further including movement limiters constituting stops for the pads, adapted to limit their movement with respect to the respective support arms and to prevent deformation of the attitude springs when said arms are in their locked position with the pads spaced from the respective discs.

* * * * *